US011107328B2

(12) United States Patent
Nelson et al.

(10) Patent No.: US 11,107,328 B2
(45) Date of Patent: Aug. 31, 2021

(54) SYSTEM AND METHOD WITH ALTERNATIVE AWARDS FOR WINNING SPORTING EVENT WAGERS

(71) Applicant: IGT, Las Vegas, NV (US)

(72) Inventors: Dwayne R. Nelson, Las Vegas, NV (US); Vincent S. Lai, Las Vegas, NV (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 16/561,803

(22) Filed: Sep. 5, 2019

(65) Prior Publication Data

US 2021/0074126 A1 Mar. 11, 2021

(51) Int. Cl.
*G06F 17/00* (2019.01)
*G07F 17/32* (2006.01)

(52) U.S. Cl.
CPC ...... *G07F 17/3288* (2013.01); *G07F 17/3211* (2013.01); *G07F 17/3246* (2013.01); *G07F 17/3258* (2013.01); *G07F 17/3267* (2013.01)

(58) Field of Classification Search
None
See application file for complete search history.

(56) References Cited

U.S. PATENT DOCUMENTS 4,883,636 A 11/1989 Fantle
7,128,320 B2 10/2006 Yamaguchi et al.
7,341,517 B2 3/2008 Asher et al.
7,351,149 B1 4/2008 Simon et al.
7,566,268 B2 7/2009 Asher et al.
7,637,807 B2 12/2009 Asher et al.
7,694,969 B2 4/2010 Abrahamson
7,785,195 B2 8/2010 Palmer et al.
7,789,754 B2 9/2010 Asher et al.
8,342,931 B2 1/2013 Fleischman
8,360,842 B2 1/2013 Simon
8,491,381 B2 7/2013 Nicely
8,636,587 B2 * 1/2014 Manfredi ............ A63F 3/00157 463/25
9,293,009 B2 3/2016 Asher et al.
10,347,085 B2 7/2019 Simon
10,460,565 B2 * 10/2019 Vann .................... G07F 17/3258
10,825,298 B1 * 11/2020 Laster .................. G07F 17/3262
2006/0040735 A1 * 2/2006 Baerlocher ......... G07F 17/3244 463/26
2008/0194307 A1 8/2008 Sanger
2009/0209331 A1 * 8/2009 Soukup ............... G07F 17/3258 463/27
2009/0239662 A1 * 9/2009 Bramble ............. G07F 17/3267 463/27
2010/0311499 A1 * 12/2010 Tarantino ................ G07F 17/32 463/27
2011/0212766 A1 * 9/2011 Bowers ............... G07F 17/3244 463/25
2012/0309489 A1 * 12/2012 Scott ................... G07F 17/3258 463/20
2014/0256423 A1 * 9/2014 Williams ............ G07F 17/3246 463/29

(Continued)

*Primary Examiner* — Paul A D'Agostino
(74) *Attorney, Agent, or Firm* — Neal, Gerber & Eisenberg LLP

(57) ABSTRACT

Systems and methods which utilize zero, one or more random determinations in association with a determination of an award of a placed sporting event wager.

20 Claims, 9 Drawing Sheets

(56) References Cited

U.S. PATENT DOCUMENTS

| | | | | |
|---|---|---|---|---|
| 2015/0105134 | A1 | 4/2015 | Cobb et al. | |
| 2015/0235526 | A1* | 8/2015 | DiCarlo | G07F 17/3267 463/20 |
| 2015/0325086 | A1* | 11/2015 | Morrissette | G07F 17/34 463/20 |
| 2016/0093168 | A1* | 3/2016 | Hall | A63F 3/00157 463/25 |
| 2016/0110965 | A1 | 4/2016 | Arnone et al. | |
| 2016/0148467 | A1* | 5/2016 | Snow | G07F 17/3293 463/25 |
| 2016/0171827 | A1* | 6/2016 | Washington | A63F 13/822 463/22 |
| 2016/0300433 | A1* | 10/2016 | Ortiz | G07F 17/32 |
| 2017/0039811 | A1* | 2/2017 | Devaraj | G07F 17/3288 |
| 2017/0084129 | A1* | 3/2017 | Baerlocher | G07F 17/3258 |
| 2017/0087443 | A1* | 3/2017 | Milosevich | A63F 3/00157 |
| 2017/0213424 | A1* | 7/2017 | Arnone | G07F 17/3225 |
| 2017/0330420 | A1* | 11/2017 | Merati | G07F 17/3244 |
| 2017/0337776 | A1* | 11/2017 | Herring | A63F 13/35 |
| 2018/0047253 | A1* | 2/2018 | Vann | G07F 17/3262 |
| 2019/0096182 | A1* | 3/2019 | Oberberger | G07F 17/3286 |
| 2019/0102993 | A1* | 4/2019 | Washington | G07F 17/3295 |
| 2019/0147697 | A1* | 5/2019 | Penacho | G07F 17/3211 463/25 |
| 2019/0147703 | A1* | 5/2019 | Malek | G07F 17/3244 463/20 |
| 2020/0357246 | A1* | 11/2020 | Nelson | G07F 17/3251 |

* cited by examiner 2116, 2118

204

202a

Down: 1
Distance: 10 Yards

202b

2018 Season
Week 3
Score:
Team X 24
Team Y 0

202c

Fourth Quarter
Time Remaining:
8:15
Play Clock: 11
Play Number: 51

210

Casino X
$50 to win $100 and 1 randomly determined mystery award having a value of $20, $50, $100, $500 or $1000 that play number 51 of football game in week 3 of 2018 season between Team X and Team Y will be a running play

204

2116, 2118

202a

Last Play:
Run for 3 Yards
Down: 2
Distance: 7 Yards

202b

2018 Season
Week 3
Score:
Team X 24
Team Y 0

202c

Fourth Quarter
Time Remaining:
7:58
Play Clock: 40
Play Number: 52

Great prediction that the last play was going to be a run. You win $100 plus a randomly determined amount of another $100 to bring your total in to $200 for this winning bet.

1000

SYSTEM AND METHOD WITH ALTERNATIVE AWARDS FOR WINNING SPORTING EVENT WAGERS

TECHNICAL FIELD

The technical field of the present disclosure is that of systems and methods that utilize zero, one or more random determinations in association with a determination of an award of a placed sporting event wager.

BACKGROUND

Sports betting terminals may enable a player to place a sports wager predicting the results of a sporting event.

BRIEF SUMMARY

In certain embodiments, the present disclosure relates to a gaming system including a processor, and a memory device that stores a plurality of instructions. When executed by the processor following a placement of a sporting event wager on an outcome of a sporting event, the instructions cause the processor to receive data associated with an exchange of an amount of an unmodified award associated with the placed sporting event wager for a variable award. When executed by the processor after a determination that the placed sporting event wager comprises a winning sporting event wager, the instructions cause the processor to determine an amount of the variable award, and cause a display, by a display device, of the determined amount of the variable award.

In certain embodiments, the present disclosure relates to a gaming system including a processor, and a memory device that stores a plurality of instructions. When executed by the processor, the instructions cause the processor to receive a placement of a sporting event wager on an outcome of a sporting event. When executed by the processor after a determination that the placed sporting event wager comprises a winning sporting event wager, prior to causing a first award associated with the winning sporting event wager to be available, and responsive to receipt of an input to forgo part of the first award associated with the winning sporting event wager, the instructions cause the processor to randomly determine a second award, wherein an average expected value of the second award is based on the forgone part of the first award.

In certain embodiments, the present disclosure relates to a method of operating a gaming system including, following a placement of a sporting event wager on an outcome of a sporting event, receiving data associated with an exchange of an amount of a unmodified award associated with the placed sporting event wager for a variable award. After a determination that the placed sporting event wager comprises a winning sporting event wager, the method includes determining, by a processor, an amount of the variable award, and displaying, by a display device, the determined amount of the variable award.

Additional features are described herein, and will be apparent from the following Detailed Description and the figures.

DETAILED DESCRIPTION

Sporting Event Wagering Alternative Awards

Figure 1:
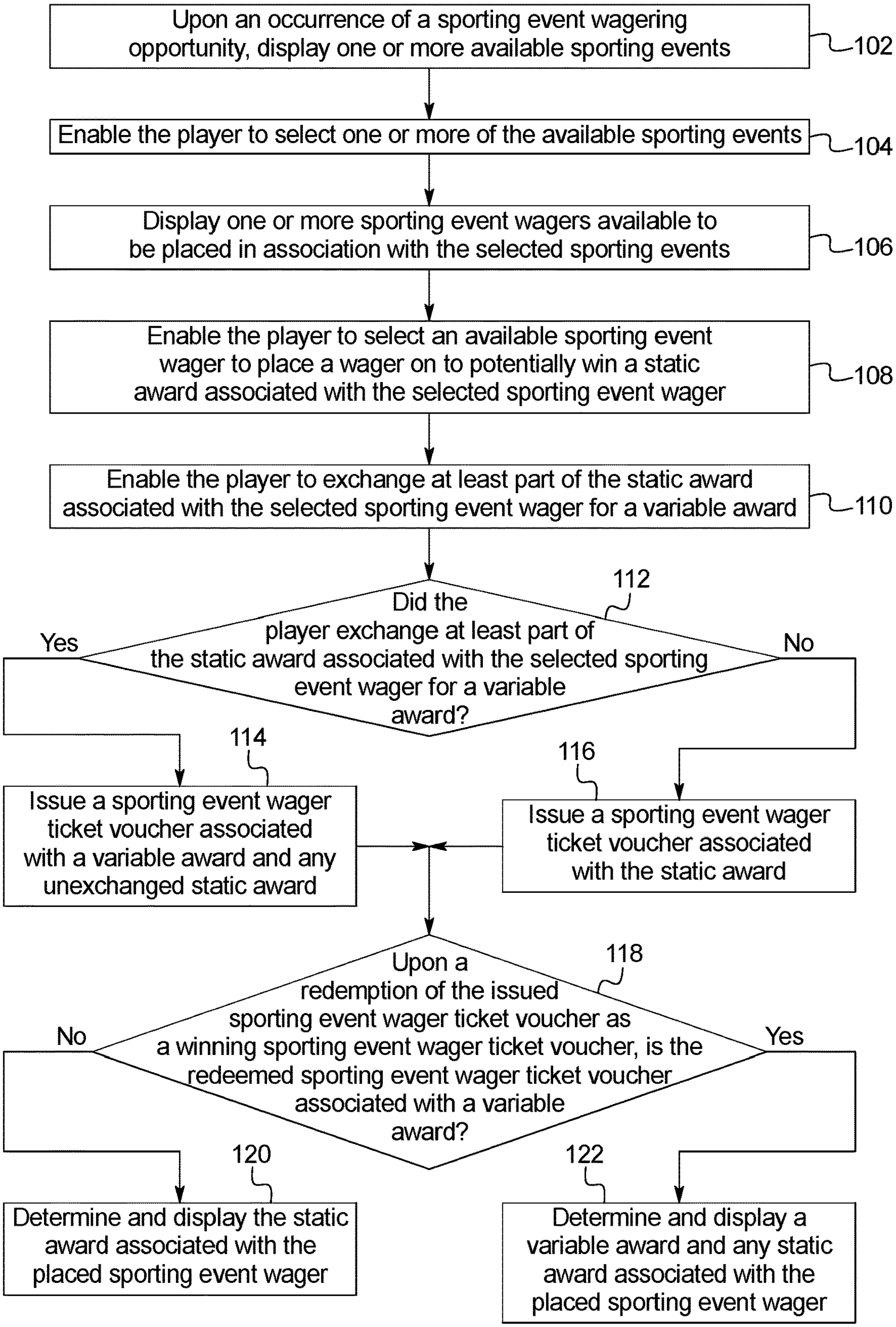
FIG. 1 is a flow chart of an example process of converting none, part or all of a static award associated with a placed sporting event wager to a variable award.

In various embodiments, the present disclosure relates generally to systems and methods which utilize zero, one or more random determinations in association with a determination of an award of a placed sporting event wager.

More specifically, in various embodiments, following the placement of a sporting event wager by a player on one or more events which may or may not occur during a sporting event, the gaming system enables the player to select if they want part or all of any award associated with the placed sporting event wager to be converted to an award opportunity to potentially win an even larger award than the player would be entitled to if the placed sporting event wager is determined to be a winning sporting event wager. That is, rather than being provided an unmodified award, such as a static award or a parimutuel award, for winning a placed sporting event wager, the gaming system disclosed herein offers the player the opportunity for a variable award for winning a placed sporting event wager. In these embodiments, if the player elects to convert part or all of the unmodified award associated with a placed sporting event wager to a variable award, upon a determination that the placed sporting event wager is a winning sporting event wager, the gaming system utilizes one or more random determinations to determine part or all of the award provided for winning the placed sporting event wager. As such, by enabling a player to select a variable award in association with a placed sporting event wager and by randomly determining an amount of such a variable award, the gaming system disclosed herein enables a player to choose the volatility of the awards available to be potentially won in association with a placed sporting event wager. Since choosing a volatility of the results of a wager placed is associated with wagering on games of chance, the gaming system bridges the divide between players that wager on games of chance (which involve one or more random determinations in determining the amount of any awards) and players that wager on sporting events (which do not involve one or more random determinations in determining the amount of any awards).

It should be appreciated that the disclosed gaming system utilized to introduce an element of randomness in one or more awards associated with one or more sporting event wagers placed may be any suitable electronic gaming machine ("EGM") (such as a sports betting terminal, a slot machine, a video poker machine, a video lottery terminal, a terminal associated with an electronic table game, a video keno machine, or a video bingo machine) which may or may not also provide one or more wagering games, any suitable slot machine interface board which is in communication with an EGM and operable to introduce an element of randomness in one or more awards associated with one or more sporting event wagers placed, any suitable personal gaming device and/or any suitable combination of a sports book wagering server operating with an EGM, a slot machine interface board associated with an EGM and/or a personal gaming device to enable the placement of one or more sporting event wagers and the introduction of an element of randomness in one or more awards associated with one or more sporting event wagers placed.

FIG. 1 is a flowchart of an example process or method of operating the gaming system of the present disclosure. In various embodiments, the process is represented by a set of instructions stored in one or more memories and executed by one or more processors. Although the process is described with reference to the flowchart shown in FIG. 1, many other processes of performing the acts associated with this illustrated process may be employed. For example, the order of certain of the illustrated blocks or diamonds may be changed, certain of the illustrated blocks or diamonds may be optional, or certain of the illustrated blocks or diamonds may not be employed.

In different embodiments, upon an occurrence of a sporting event wagering opportunity, the gaming system displays one or more available sporting events (which the player may place one or more sporting event wagers on) and enables a player to select one or more of the available sporting events as indicated in blocks 102 and 104.

In certain embodiments, the gaming system is associated with a plurality of different sporting events which may be different types of sporting events available for selection (e.g., football games and hockey games) and/or different sporting events of the same type (e.g., different college basketball games) wherein the gaming system displays different configurations of such sporting events to the player. In different embodiments, the one or more available sporting events displayed which the player may place one or more sporting event wagers on include any suitable sporting event and/or electronic sporting event at any professional and/or amateur level including but not limited to, football, basketball, baseball, boxing, horse racing, wrestling, mixed martial arts, golf, cricket, soccer, hockey, field hockey, tennis, volleyball, table tennis, ruby, swimming, diving, archery, cycling, billiards, fishing, gymnastics, hunting, track and field, sailing, and/or car racing.

In certain embodiments, a sporting event wagering opportunity occurs upon a player depositing an amount of funds to increase a credit balance. In certain embodiments, a sporting event wagering opportunity automatically occurs if the gaming system is not otherwise being actively engaged (e.g., if a player is not making any sporting event wagers or otherwise playing any games of the gaming system). In certain of these embodiments, based on the historic sporting event wagering activity of a current gaming session (i.e., which types of sporting events have been wagered on during the current gaming session), the gaming system determines certain sporting events to display and certain sporting events to not display. In certain embodiments, a sporting event wagering opportunity occurs upon a player logging into a player tracking system associated with the gaming system. In certain of these embodiments, based on the player's historic sporting event wagering activity and/or the player's preferences, the gaming system determines certain sporting events to display to the identified player and certain sporting events to not display to the identified player.

In certain embodiments, one or more of the available sporting events displayed include live sporting events, such as sporting events currently being played. In certain embodiments, one or more of the available sporting events displayed include future sporting events, such as sporting events that will soon be played. In these embodiments, the gaming system displays identifying information regarding the sporting event, such as identifying the participants in the sporting event, information about the participants historical performance in similar sporting events, and the odds of one or more sporting event wagers available in association with such sporting events.

In certain embodiments, one or more of the available sporting events displayed include historical sporting events, such as a prerecorded sporting event, or a recreation of a prior sporting event. In these embodiments, to prevent players from determining an outcome of the historic sporting event prior to placing any sporting event wagers on that historic sporting event, the gaming system masks certain of the identifying information associated with that sporting event. That is, the gaming system anonymizes identifying information about teams, historical team records, sporting event players, and/or historical sporting event player statistics each time that information is presented to players to select whether to wager on a given sporting event.

In certain embodiments, one or more of the available sporting events displayed include virtual or electronic sport ("eSport") events. In different embodiments, such virtual or eSports events are played by humans, by computer driven participants or by a mix of human and computer driven participants.

In certain embodiments, the selection of one or more sporting events include the selection of a type of sporting event followed by another selection of a specific sporting event of the selected type of sporting event. For example, after the selection of a "football" type of sporting event, the gaming system enables the player to select one or more different "football" sporting events to potentially wager on. In certain other embodiments, the selection of one or more sporting events include the selection of a specific sporting event.

In certain embodiments, to assist the player in selecting one or more sporting events and/or types of sporting events, the gaming system displays certain information regarding the different available selections of sporting events, such as a generic description of the sporting event, a generic description of the type of sporting event, one or more of the available sporting event wagers for one or more sporting events and/or the odds of such sporting event wagers. In certain embodiment, the gaming system additionally or alternatively enables the player to select one or more parameters that assist the player in selecting the sporting event and/or type of sporting event to place one or more sporting event wagers on.

Following the selection of one or more sporting events, the gaming system displays one or more sporting event wagers available to be placed in association with the selected sporting event as indicated in block 106 of FIG. 1. That is, for the one or more selected sporting events, the gaming system displays one or more betting options available for the player to place a sporting event wager on.

It should be appreciated that each sporting event wager displayed to the player include any suitable sporting event wager including, but not limited to, any suitable moneyline wager on an outcome of a sporting event (e.g., Team X will win the game), any suitable wager on an outcome of a sporting event which accounts for a point spread (e.g., Team X will win the game by ten points), any suitable proposition wager on an in-game event occurring or not occurring within the sporting event (e.g., Player A will make the next free throw), any suitable handicap wager, any suitable if and reverse wager, any suitable total/over-under wager, any suitable full cover wager, any suitable future/outright wager, any suitable parlay/accumulator multiple sporting event wagers (including but not limited to a progressive parlay wager, a teaser and pleaser wager, a grand salami wager, and/or a round robin wager) and/or any combination of these different available sporting event wagers.

In certain embodiments, the gaming system displays to the player pertinent wagering information regarding the one or more sporting event wagers available to be placed, such as, but not limited to, the participants in the sporting event (including historic information regarding such participants in the sporting event), the odds of a particular action or event occurring in the sporting event, the amounts available to be wagered, and/or the static awards provided if the different sporting event wagers are determined to be winning sporting event wagers. In certain embodiments wherein the sporting event is a historic sporting event, the gaming system anonymizes certain of the information that can be used to identify the sporting event to be wagered on. In these embodiments, the gaming system displays to the player a list of unidentifiable teams to select and their odds of winning, and historical information about each team, such as their performance during the chosen season. In certain other embodiment wherein the sporting event is a live or upcoming sporting event, the gaming system displays non-anonymized information (e.g., live sports book information obtained via a sports betting service) regarding the live or upcoming sporting event.

In certain embodiments, the gaming system enables the player to reject the sporting event wagers available to be placed and select another sporting event to potentially wager on. That is, similar to a sports book wherein a player is presented with many sporting events that they can place different wagers upon, the gaming system enables a player to reject the sporting event wagers presented to the player such that another subset of sporting event wagers are subsequently presented to be potentially placed. In another embodiment, multiple sporting event wagers within the sporting event are presented to the player, and the gaming system enables the player pick a subset of the sporting event wagers presented to place. In this embodiment, if the player picks more than one sporting event wager to place within one or more sporting events, the gaming system employs a parlay bet with adjusted odds. In another embodiment, the gaming system requires the player to place a primary sporting event wager wherein two or more subsequent sporting event wagers placed within one or more sporting events are associated with a parlay bet with adjusted odds.

Following the display of the available sporting event wagers, the gaming system enables the player to select an available sporting event wager to place a wager on to potentially win a static award associated with the selected sporting event wager as indicated in block 108 of FIG. 1.

Figure 2A:
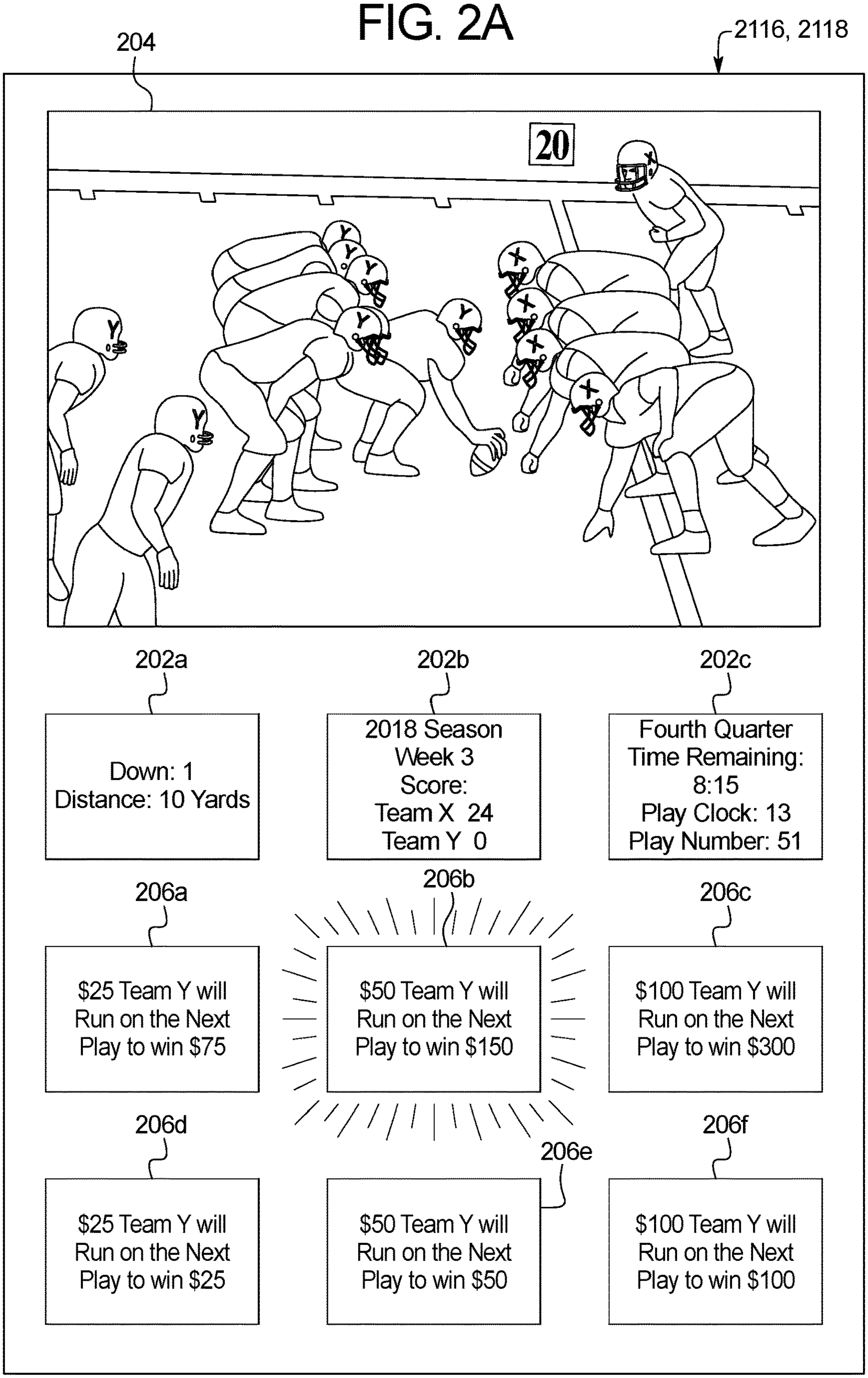
FIGS. 2A, 2B, 2C and 2D are front views of one embodiment of the gaming system disclosed herein illustrating the placement of a sporting event wager, the conversion of part of a static award associated with the placed sporting event wager to a variable award, and a determination of the variable award.

In certain embodiments, the available sporting event wagers are associated with a wager amount and a static award (i.e., a unmodified win amount if that sporting event wager is determined to be a winning sporting event wager) wherein the selection of a sporting event wager includes the selection of an amount to wager on the sporting event to win the static award. For example, as seen in FIG. 2A, following an EGM displaying information 202*a* to 202*c* regarding the live stream of a professional football game between Team X and Team Y 204 (i.e., the selected sporting event) and also displaying a plurality of different available sporting event wagers on the next play of the streamed professional football game and the corresponding static awards if such available sporting event wagers are won 206*a* to 206*f*, the player selected a sporting event wager of $50 to win $150 that the next play of the stream of the professional football game will be a running play 206*b*. In certain embodiments, the available sporting event wagers are not associated with wager amounts nor static awards wherein in addition to selecting a sporting event wager to place, the gaming system enables the player to select an amount of the sporting event wager to place to win an associated static award.

In certain embodiments, the available sporting event wagers are associated with a wager amount and a parimutuel award which is determined after all sporting event wagers have been placed. In these embodiments, the selection of a sporting event wager includes the selection of an amount to wager on the sporting event wherein all sporting event wagers of a particular type are placed together in a pool and then after the deduction of applicable fees (e.g. the vigorish) and/or taxes, the payoff odds are determined by sharing the pool among all winning bets. For example, an EGM displays to a player that they can place a wager of $50 that the next play of the stream of the professional football game will be a running play wherein the win amount (if the placed sporting event wager is a winning wager) is determined after everyone in the gaming system has wagered on what the next play of the stream of the professional football game will be.

In certain embodiments, in association with the selection of a sporting event wager to place, the gaming system communicates data associated with the sporting event wager to a sports book wagering server (or other component tasked with tracking placed sporting event wagers). For example, after the player selected a sporting event wager of $50 to win $150 that the next play of a stream of a professional football game will be a running play, the EGM where the player selected such a sporting event wager communicates data associated with the selected sporting event wager to be placed to a sports book wagering server. In certain embodiments, rather than the gaming system communicating data associated with the selected sporting event wager to place, a component of a gaming establishment management system, such as a slot machine interface board associated with the EGM (i.e., a component of the EGM)) communicates data associated with the selected sporting event wager to place to a sports book wagering server (or other gaming establishment component tasked with tracking placed sporting event wagers).

In certain embodiments, following the sports book wagering server receiving the data associated with the placed sporting event wager, the sports book wagering server (or other gaming establishment component tasked with tracking the placed sporting event wager) determines whether to accept or reject the attempted sporting event wager. If the sports book wagering server accepts the attempted sporting event wager, the sports book wagering server associates a placed sporting event wager identifier with the selected sporting event wager to place and stores the placed sporting event wager identifier (which is associated with the placed sporting event wager). On the other hand, if the sports book wagering server rejects the attempted sporting event wager, the sports book wagering server communicates a denial notification to the gaming system to display to the player.

In certain embodiments, following the selection and placement of a sporting event wager, the gaming system enables the player to exchange at least part of the static award associated with the selected sporting event wager for a variable award as indicated in block 110 of FIG. 1. That is, rather than placing a sporting event wager associated with a known award (if the sporting event wager is a winning bet) and waiting to determine if they won such a known award, the gaming system disclosed herein enables the player the chance to forgo part or all of such a known award for the opportunity to win an unknown award or a series of unknown awards (if the sporting event wager is a winning bet). In other words, following the placement of a sporting event wager associated with an unmodified award (e.g., a known static award to be won if the sporting event wager is a winning bet or an unknown parimutuel award to be subsequently determined and won if the sporting event wager is a winning bet), the gaming system enables the player to accept such a placed sporting event wager associated with the unmodified award or reject the placed sporting event wager associated with the unmodified award in lieu of a sporting event wager associated with a yet to be determined variable award.

In certain parimutuel embodiments wherein the selection of a sporting event wager includes the selection of an amount to wager on the sporting event and a yet-to-be-determined award amount, following the selection and placement of a sporting event wager, the gaming system enables the player to exchange at least part of the yet-to-be determined award associated with the selected sporting event wager for a variable award. That is, rather than placing a sporting event wager associated with a parimutuel award (if the sporting event wager is a winning bet) and waiting to determine if they won such a parimutuel award, the gaming system disclosed herein enables the player the chance to forgo part or all of such an umodified parimutuel award for the opportunity to win a variable award or a series of variable awards (if the sporting event wager is a winning bet). In other words, following the placement of a sporting event wager associated with a parimutuel award, the gaming system enables the player to accept such a placed sporting event wager associated with the parimutuel award or reject the placed sporting event wager in lieu of a sporting event wager associated with a yet to be determined variable award. For example, following the placement of a wager of $50 that the next play of the stream of the professional football game will be a running play, the EGM enables the player to convert $50 of any win amount (which is determined from the parimutual pool after everyone in the gaming system has wagered on what the next play of the stream of the professional football game will be) to a mystery award.

In certain embodiments, an average expected value of the variable award which a static award is exchanged for is equal to the value of the exchanged static award. In these embodiments, the average expected value of the variable award is a theoretical value wherein the actual determined amount of the variable award may be less than, equal to or greater than this average expected value. For example, if the static award associated with a placed sporting event wager being a winning sporting event wager is $100, the gaming system enables the player to convert this $100 for a variable award which is selected from a range of $50 to $1,500, wherein the different values of the range are associated with different probabilities of being randomly selected such that the variable award has an average expected value of $100. In certain embodiments, an average expected value of the variable award which a static award is exchanged for is unequal to the value of the exchanged static award. For example, to entice a player to utilize this feature, if the static award associated with a placed sporting event wager being a winning sporting event wager is $100, the gaming system enables the player to convert this $100 for a variable award having an average expected value of $120. In another example, to mitigate risk associated with increasing the volatility of such sporting event wagers, if the static award associated with a placed sporting event wager being a winning sporting event wager is $100, the gaming system enables the player to convert this $100 for a variable award having an average expected value of $90.

Figure 2B:
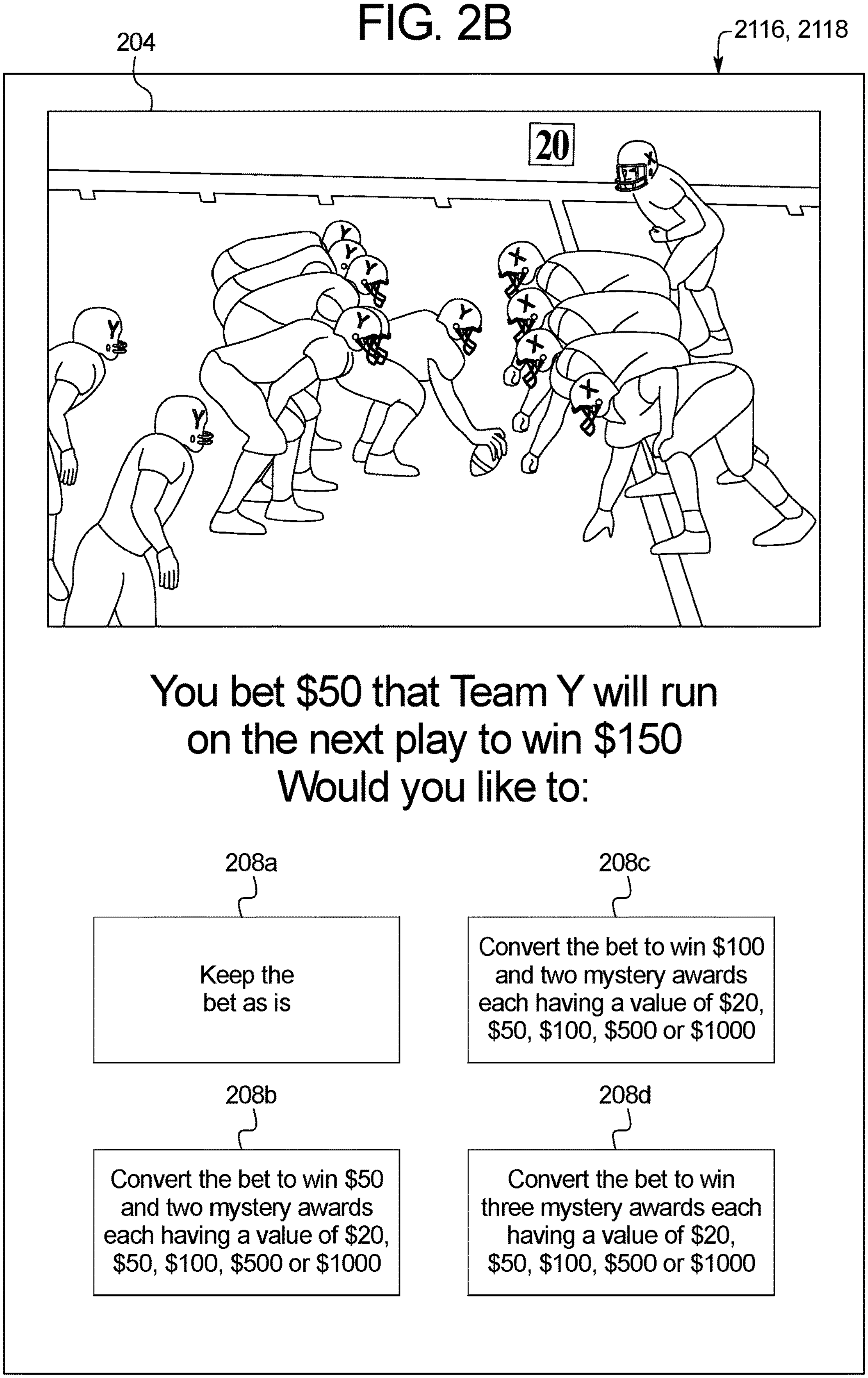

In certain embodiments, the gaming system enables the player to exchange the entire unmodified award associated with the placed sporting event wager for a variable award. In certain embodiments, the gaming system enables the player to exchange part or all of the unmodified award associated with the placed sporting event wager for a variable award. Continuing with the above example, if the static award associated with a placed sporting event wager being a winning sporting event wager is $150, the gaming system enables the player to select from zero mystery awards to up to three mystery awards (e.g., loot boxes each having an average expected value of $50) to determine a portion of the static award to convert to a variable award. In this example, as seen in FIG. 2B, the gaming system enables the player to: (i) convert, via a first selection 208*a*, none of the $150 static award to a mystery award; (ii) convert, via a second selection 208*b*, a $50 portion of the $150 static award to a mystery award having an average expected value of $50; (iii) convert, via a third selection 208*c*, a $100 portion of the $150 static award to two mystery awards each having an average expected value of $50; or (iv) convert, via a fourth selection 208*d*, the entire $150 of the static award to a three mystery awards having an average expected value of $50. It should be appreciated that in these embodiments, any portion of the unmodified award not converted to a variable award remains an unmodified award associated with the sporting event wager. For example, following a determination to convert a $50 portion of a $150 static award associated with a placed sporting event wager to a mystery award having an average expected value of $50, the placed sporting event wager is associated with a $100 static award (if the placed sporting event wager is a winning sporting event wager) and also associated with a variable award having an average expected value of $50 (if the placed sporting event wager is a winning sporting event wager).

Figure 2C:
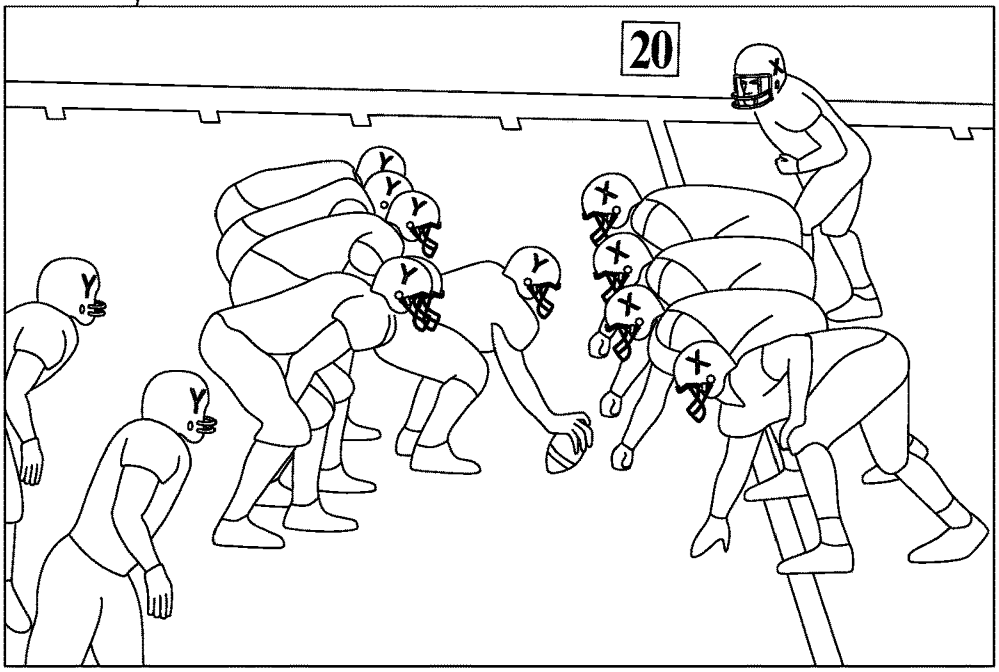

If the player exchanges at least part of the static award for a variable award, then as indicated in diamond 112 and block 114 of FIG. 1, the gaming system issues a sporting event wager ticket voucher associated with a variable award and any unexchanged static award. In this embodiment, the sporting event wager ticket voucher, which may be in printed or virtual form, indicates the amount of the placed sporting event wager and information associated with the variable award and any static award associated with the placed sporting event wager if that placed sporting event wager is a winning sporting event wager. For example, as seen in FIG. 2C, following an input made to convert $50 of the $150 static award to a mystery award having an average expected value of $50 (not shown), the gaming system displays a sporting event wager virtual ticket voucher indicating that informs the player that if the placed sporting event wager is a winning sporting event wager, the player is entitled to $100 and one random award determination of a mystery award having a value of $20, $50, $100, $500 or $1000.

On the other hand, if the player decides not exchange any part of the static award for a variable award, then as indicated in diamond 112 and block 116 of FIG. 1, the gaming system issues a sporting event wager ticket voucher associated with the static award. In this embodiment, the sporting event wager ticket voucher, which may be in printed or virtual form, indicates the amount of the placed sporting event wager and information associated with the static award associated with the placed sporting event wager if that placed sporting event wager is a winning sporting event wager.

In addition to issuing a sporting event wager ticket voucher in association with a placed sporting event wager, if the placed sporting event wager is determined to be a winning sporting event wager, then upon a redemption of the issued sporting event wager ticket voucher as a winning sporting event wager ticket voucher, the gaming system determines if the redeemed sporting event wager ticket voucher is associated with a variable award as indicated in diamond 118 of FIG. 1. Put differently, following the determination that the placed sporting event wager is a winning sporting event wager (which is based on one or more events occurring (or not occurring) in one or more sporting events and data associated with such events being received from the sports book wagering server (or other gaming establishment component tasked with tracking the placed sporting event wagers)) and the holder of the associated sporting event wager ticket voucher is entitled to an unmodified award and/or a variable award associated with the winning sporting event wager, the gaming system determines the type of award to provide.

If the gaming system determines that the redeemed sporting event wager ticket voucher is not associated with a variable award, the gaming system determines and displays the static award associated with the placed sporting event wager as indicated in block 120 of FIG. 1. That is, if the player did not elect to participate in the feature of converting part or all of an unmodified award associated with a placed sporting event wager to a variable award, upon a determination that the placed sporting event wager is a winning sporting event wager, the gaming system proceeds to make the unmodified award associated with the winning sporting event wager available to the player.

On the other hand, if the gaming system determines that the redeemed sporting event wager ticket voucher is associated with a variable award, the gaming system determines and displays a variable award and any static award associated with the placed sporting event wager as indicated in block 122 of FIG. 1. In other words, if the player elected to participate in the feature of converting part or all of an unmodified award associated with a placed sporting event wager to a variable award, upon a determination that the placed sporting event wager is a winning sporting event wager, the gaming system proceeds to determine a variable award associated with the winning sporting event wager to make available to the player along with any unconverted portion of the unmodified award associated with the winning sporting event wager.

Figure 2D:
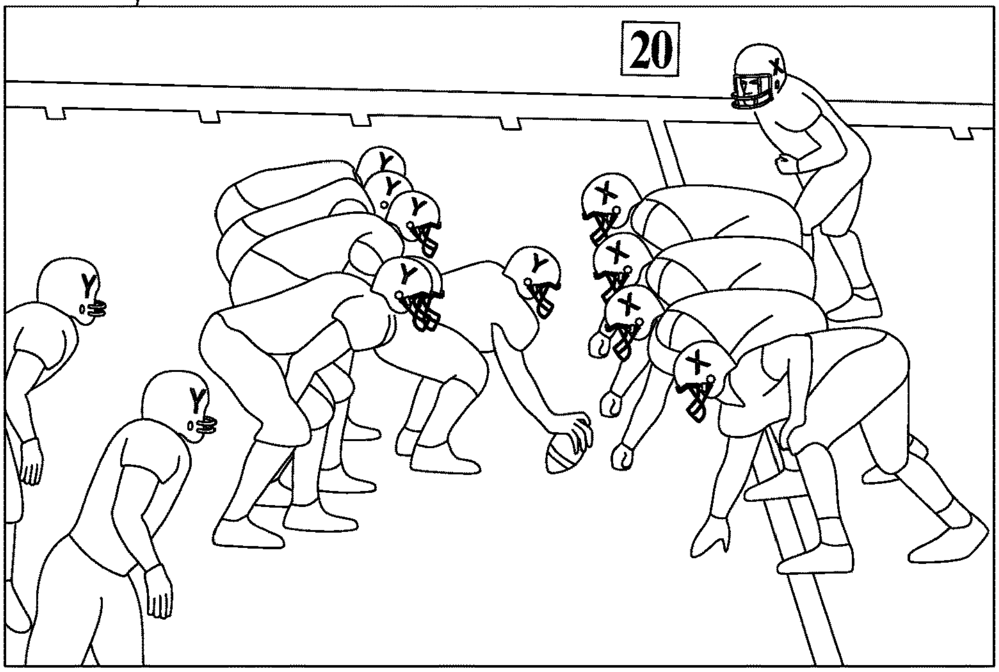

In certain embodiments, the gaming system utilizes a weighted table including different award amounts and different probabilities of being randomly selected to determine a variable award associated with the winning sporting event wager. For example, as seen in FIG. 2D, following a determination that the placing sporting event wager is a winning sporting event wager and following the redemption of the sporting event wager virtual ticket voucher, the gaming system randomly selects a value of $100 as the variable award (from the available values $20, $50, $100, $500 and $1000) and provides this $100 variable award to the player in addition to the $100 static award associated with the placed sporting event wager.

In certain embodiments, to determine a variable award, the gaming system additionally or alternatively enables a play of a game to determine the amount of the variable award. In these embodiments, the gaming system enables one or more plays of a game wherein the one or more awards associated with the one or more outcomes determined for such one or more plays of the game form the variable award. In such embodiments, the play of the game utilizes zero, one or more random determinations to determine the variable award thereby introducing an element of randomness into sporting event wagering.

In certain embodiments, one or more of the games the gaming system utilizes to determine an amount of the variable award include games of skill. In these embodiments, the gaming system enables a player to make one or more quantifiable skill inputs to at least partially determine the variable award. In such embodiments, the play of the game of skill utilizes zero, one or more skill-based inputs to determine the variable award thereby introducing an additional element of skill into sporting event wagering. In these embodiments, a player's skill is determined and quantified by one or more inputs (or the lack of any inputs) by the player that tend to measure one or more aspects of the player's skill. It should be appreciated that for purposes of this application, skill includes: (i) physical skill, such as, but not limited to: timing, aim, physical strength or any combination thereof which is quantifiable by zero, one or more inputs made by the player in association with the skill-based game; (ii) mental skill (i.e., knowledge, reasoning, and/or strategy) which is quantifiable by one or more inputs made by the player (or the lack of any inputs made by the player) in association with the skill-based game; and (iii) any other type of skill which is quantifiable by one or more inputs made by the player (or the lack of any inputs made by the player) in association with the skill-based game. In various embodiments, the player utilizes one or more skill input devices to make one or more quantifiable skill inputs. Examples of skill input devices include, but are not limited to: joysticks, buttons, a mouse or a plurality of mice, one or more trackballs, one or more pointing devices, a personal gaming device, such as a mobile device, one or more bodily motion trackers such as motion sensing devices for human-computer interaction, touchpads, touchscreens, one or more controllers with: (1) one or more motion sensing devices, (2) one or more proximity sensing devices, (3) one or more force sensing devices (transducers), (4) one or more accelerometers, or any other suitable skill input devices. In these embodiments, by making one or more quantifiable skill inputs, the player manipulates, influences or otherwise controls one or more aspects of the skill-based game.

As indicated above, any suitable game of chance and/or game of skill may be employed in association with determining part or all of a variable award associated with a winning sporting event wager. In different embodiments, such plays of a game includes, but are not limited to: a play of any suitable video or mechanical slot or reel game; a play of any suitable card game, such as but not limited to any suitable poker game, any suitable blackjack game, or any suitable Baccarat game; a play of any suitable keno game; a play of any suitable bingo game; a play of any suitable table game (whether or not such table game is occurring at a gaming table); a play of any suitable wheel game; a play of any suitable offer and acceptance game; a play of any suitable award ladder game; a play of any suitable puzzle-type game; a play of any suitable persistence game; a play of any suitable selection game; a play of any suitable cascading symbols game; a play of any suitable ways to win game; a play of any suitable scatter pay game; a play of any suitable coin-pusher game; a play of any suitable elimination game; a play of any suitable stacked wilds game; a play of any suitable trail game; a play of any suitable bingo game; a play of any suitable video scratch-off game; a play of any suitable pick-until-complete game; a play of any suitable shooting simulation game; a play of any suitable racing game; a play of any suitable promotional game; a play of any suitable high-low game; a play of any suitable lottery game; a play of any suitable number selection game; a play of any suitable dice game; a play of any suitable auction game; a play of any suitable reverse-auction game; and/or a play of any suitable group game.

It should be appreciated that in these embodiments, since one or more random selections from a weighted table, one or more plays of one or more games of chance and/or one or more plays of a game of skill may result in an award of zero, exchanging part or all of an unmodified award associated with a placed sporting event for a variable award represents an exchange of such an unmodified award for an opportunity to obtain one or more awards. That is, while such a variable award has an average expected value (i.e., a theoretical value which is based on the awards available and the probability of obtaining any of such awards), since one or more determinations subsequently occur in association with the determination of the variable award and an actual value of the determined variable award is based on the results of such determinations (wherein the actual value may be a lucrative value or a value of zero), the exchange of a unmodified award for a variable award of these embodiments may be viewed as an exchange of a unmodified award for a chance to win another award.

Accordingly, the gaming system disclosed herein employs one or more additional determinations in association with an award of a winning sporting event wager to introduce a degree of uncertainty for potentially more lucrative awards. As such, by enabling a player to select to pursue a variable award in association with a placed sporting event wager and by independently determining an amount of such a variable payout amount separate from any event of the sporting event, the gaming system disclosed herein enables a player to customize their sporting event wagering experience by choosing a volatility of one or more awards available to be potentially won in association with one or more placed sporting event wagers. Such a configuration thus introduces certain aspects of how one or more games of chance (and/or games of skill) play to players whom wager on sporting events which are absent such aspects.

In certain embodiments, the determined variable award associated with a winning sporting event wager includes a monetary amount. In certain embodiments, the determined variable award additionally or alternatively includes a progressive award, such as a progressive award funded by a portion of one or more sporting event wagers placed. In certain embodiments, the determined variable award additionally or alternatively includes an entry in a drawing, such as an entry to win a progressive award. In certain embodiments, the determined variable award additionally or alternatively includes a quantity of player tracking points. In certain embodiments, the determined variable award additionally or alternatively includes a player tracking point (or other comp) modifier applicable to a quantity of player tracking points (or other comps) subsequently earned by the user. In certain embodiments, the determined variable award additionally or alternatively includes a player tracking point (or other comps) modifier applicable to a quantity of player tracking points (or other comps) previously earned by the user. In certain embodiments, the determined variable award additionally or alternatively includes a quantity of promotional credits usable to fund one or more plays of one or more games of chance (and/or games of skill). In certain other embodiments, the determined variable award additionally or alternatively includes a quantity of promotional credits usable to fund one or more plays of one or more online games of chance (and/or games of skill) accessible remote from the gaming establishment. In certain embodiments, the determined variable award additionally or alternatively includes a quantity of virtual credits usable for a play of a social or non-wagering game. In certain embodiments, the determined variable award additionally or alternatively includes a conditional award that the player becomes eligible for based on the satisfaction of one or more criteria. It should be appreciated that any suitable criteria associated with the gaming establishment, associated with an entity having a relationship with the gaming establishment or independent of the gaming establishment may be utilized to determine whether or not the player satisfies such criteria and thus becomes eligible to win the conditional award.

In certain embodiments, the determined variable award additionally or alternatively includes a modification of one or more subsequently placed sporting event wagers. In one such embodiment, the determined variable award includes a voucher for better odds on a future sporting event. For example, the variable award randomly determined from a play of a slot game includes +20 odds for one or more future sporting events such that a player that uses the +20 odds on a bet that Team A will win a football game causes the odds on that sporting event wager to adjust from −120 to −100 odds. It should be appreciated the if determined variable award additionally or alternatively includes a modification of one or more subsequently placed sporting event wagers, in certain embodiments, the overall benefit of the spread reduction for future odds still results in the overall payout that was previously calculated for the previous sporting event wager placed. In this example, the spread reduction of +20 odds won from a wager amount of $100 could not then be applied to a wager of $10,000, but rather can only be applied to another wager amount of $100. In certain embodiments, the determined variable award additionally or alternatively includes a feature usable in association with a play of a game. That is, the determined variable award is associated with one or more plays of one or more games and a modification or activation to one or more game play features and/or an addition or unlocking of one or more game play features. In certain of these embodiments, the determined variable award includes altering or otherwise modifying one or more features, aspects or parameters of one or more subsequently played games. In these embodiments, a determined variable award includes any suitable feature which modifies any aspect of any game subsequently played by the user which is associated with the offered variable award. In various embodiments, one or more features employed as a determined variable award to modify one or more aspects of one or more such games subsequently played include, but are not limited to: a feature modifying one or more symbols available to be generated for a subsequent play of a game; a feature modifying one or more wild symbols available to be generated for a subsequent play of a game; a feature modifying a quantity of reels to be used for a subsequent play of a game; a feature modifying which of a plurality of reel are to be used for a subsequent play of a game; a feature modifying a deck of playing cards to be used for a subsequent play of a game; a feature modifying a quantity of playing cards to be used for a subsequent play of a game; a feature modifying a quantity of poker hands to be dealt for a subsequent play of a game; a book-end wild symbols feature; a stacked wild symbols feature; an expanding wild symbols feature; a retrigger symbol feature; an anti-terminator symbol feature; a locking reel feature, a locking symbol position feature; a modifier, such as a multiplier, feature; a feature modifying an amount of credits of a credit balance; a feature modifying an amount of promotional credits; a feature modifying a placed wager amount (e.g., a player placed a bet of $1 which is treated by the EGM as a bet of $2); a feature modifying a placed side wager amount; a feature modifying a rate of earning player tracking points; a feature modifying a rate of earning promotional credits; a feature modifying a rate of earning virtual credits; a feature modifying a number of wagered on paylines; a feature modifying a wager placed on one or more paylines (or on one or more designated paylines); a feature modifying a number of ways to win wagered on; a feature modifying a wager placed on one or more ways to win (or on one or more designated ways to win); a feature modifying an average expected payback percentage of a subsequent play of a game; a feature modifying an average expected payout of a subsequent play of a game; a feature modifying one or more awards available; a feature modifying a range of awards available; a feature modifying a type of awards available; a feature modifying one or more progressive awards; a feature modifying which progressive awards are available to be won; a feature modifying one or more modifiers, such as multipliers, available; a feature modifying an activation of a reel (or a designated reel); a feature modifying an activation of a plurality of reels; a feature modifying a generated outcome (or a designated generated outcome); a feature modifying a generated outcome (or a designated generated outcome) associated with an award over a designated value; a feature modifying a generated outcome (or a designated generated outcome) on a designated payline; a feature modifying a generated outcome (or a designated generated outcome) in a scatter configuration; a feature modifying a winning way to win (or a designated winning way to win); a feature modifying a designated symbol or symbol combination; a feature modifying a generation of a designated symbol or symbol combination on a designated payline; a feature modifying a generation of a designated symbol or symbol combination in a scatter configuration; a feature modifying a triggering event of a play of a secondary or bonus game; a feature modifying an activation of a secondary or bonus display (such as an award generator); a feature modifying a quantity of activations of a secondary or bonus display (e.g., a feature modifying a quantity of spins of an award generator); a feature modifying a quantity of sections of a secondary or bonus display (e.g., a feature modifying a quantity of sections of an award generator); a feature modifying one or more awards of a secondary or bonus display; a feature modifying an activation of a community award generator; a feature modifying a quantity of activations of a community award generator; a feature modifying a quantity of sections of a community award generator; a feature modifying one or more awards of a community award generator; a feature modifying a generated outcome (or a designated generated outcome) in a secondary game; a feature modifying a quantity of picks in a selection game (e.g., provide a player four picks in a selection game otherwise associated with 3 picks); a feature modifying a quantity of offers in an offer and acceptance game; a feature modifying a quantity of moves in a trail game; a feature modifying an amount of free spins provided; a feature modifying a game terminating or ending condition; a feature modifying an availability of a secondary game; a feature modifying a theme of a game; and/or a feature modifying any game play feature associated with any play of any game disclosed herein.

In certain embodiments, the determined variable award is associated with one or more parameters of the placed sporting event wager. For example, if the winning sporting event wager including Team X winning a game, the variable award includes products and/or services associated with Team X. In certain embodiments, the determined variable award is independent of any parameters of the placed sporting event wager.

In different such embodiments, the determined variable award additionally or alternatively includes one or more of a quantity of non-monetary credits, one or more comps, such as a free meal at a buffet, a free night's stay at a hotel, an upgrade for a stay at a hotel, tickets to a show, a high value product such as a car, or a low value product, one or more coupons or promotions usable within and/or outside of the gaming establishment (e.g., a $10 off coupon for a show), virtual goods associated with one or more gaming establishment components, and/or virtual goods not associated with any gaming establishment components.

In certain embodiments, the gaming system enables a player to exchange the unmodified award for a variable award upon placing the sporting event wager but prior to any determination of if the placed sporting event wager is a winning sporting event wager. In these embodiments, following the placement of the sporting event wager, the gaming system enables the player to make one or more inputs if they would like any portion of the unmodified award associated with the placed sporting event wager to be converted to a variable award. In certain embodiments, the gaming system enables a player to exchange the unmodified award for a variable award upon a determination that the placed sporting event wager is a winning sporting event wager. In these embodiments, following receipt of the sporting event wager ticket voucher associated with the winning sporting event wager but before causing the unmodified award associated with the winning sporting event wager to be available to the player, the gaming system enables the player to make one or more inputs if they would like any portion of the unmodified award associated with the winning sporting event wager to be converted to a variable award. In certain embodiments, the gaming system enables a player to exchange the unmodified award for a variable award either upon placing the sporting event wager (but prior to any determination of if the placed sporting event wager is a winning sporting event wager) or following receipt of the sporting event wager ticket voucher associated with a winning sporting event wager (but before causing the unmodified award associated with the winning sporting event wager to be available to the player).

In certain embodiments, the gaming system enables a player to redeem a losing sporting event wager ticket voucher for a variable award. In these embodiments, as a consolation prize to a player who lost their sporting event wager, the gaming system enables the player to redeem such a losing sporting event wager for a determination of a variable award.

Alternative Embodiments

It should be appreciated that in different embodiments, one or more of:

i. when a sporting event wagering opportunity occurs;
ii. which available sporting events to display;
iii. whether to utilize a historic sporting event, a live sporting event and/or a future sporting event;
iv. a quantity of available sporting events to display;
v. which available sporting event wagers to display;
vi. a quantity of available sporting event wagers to display;
vii. the odds of one or more available sporting event wagers;
viii. a quantity of available sporting event wagers to enable a player to wager on;
ix. which information to display on a sporting event wager ticket voucher;
x. whether to enable a player to exchange an unmodified award associated with a placed sporting event wager for a variable award;
xi. how to determine a variable award;
xii. when to determine a variable award;
xiii. which variable award to make available to a player; and/or
xiv. any determination disclosed herein;

is/are predetermined, randomly determined, randomly determined based on one or more weighted percentages, determined based on a generated symbol or symbol combination, determined independent of a generated symbol or symbol combination, determined based on a random determination by the central controller, determined independent of a random determination by the central controller, determined based on a random determination at the gaming system, determined independent of a random determination at the gaming system, determined based on at least one play of at least one game, determined independent of at least one play of at least one game, determined based on a player's selection, determined independent of a player's selection, determined based on one or more side wagers placed, determined independent of one or more side wagers placed, determined based on the player's primary game wager, determined independent of the player's primary game wager, determined based on time (such as the time of day), determined independent of time (such as the time of day), determined based on an amount of coin-in accumulated in one or more pools, determined independent of an amount of coin-in accumulated in one or more pools, determined based on a status of the player (i.e., a player tracking status), determined independent of a status of the player (i.e., a player tracking status), determined based on one or more other determinations disclosed herein, determined independent of any other determination disclosed herein or determined based on any other suitable method or criteria.

Gaming Systems

The above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices.

In various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts. As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a central server, central controller, or remote host through a data network.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the data network is a WAN, the gaming system includes a central server, central controller, or remote host and an EGM (or personal gaming device) each located in a different gaming establishment in a same geographic area, such as a same city or a same state. Gaming systems in which the data network is a WAN are substantially identical to gaming systems in which the data network is a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique player name and password combination assigned to the player. The central server, central controller, or remote host may, however, identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device). Examples of implementations of Internet-based gaming are further described in U.S. Pat. No. 8,764,566, entitled "Internet Remote Game Server," and U.S. Pat. No. 8,147,334, entitled "Universal Game Server".

The central server, central controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 3:
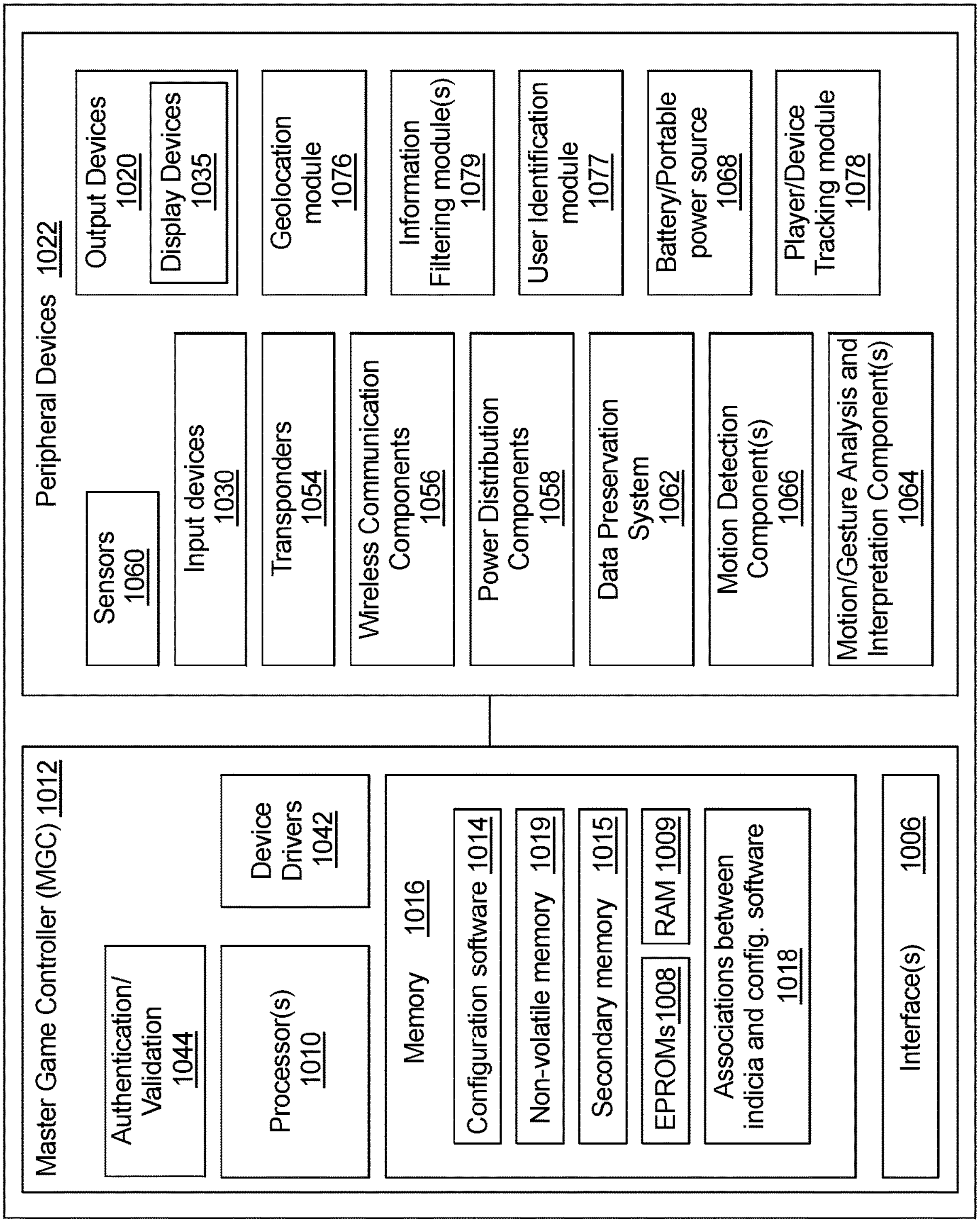
FIG. 3 is a schematic block diagram of one embodiment of an electronic configuration of an example gaming system disclosed herein.
Figure 4A:
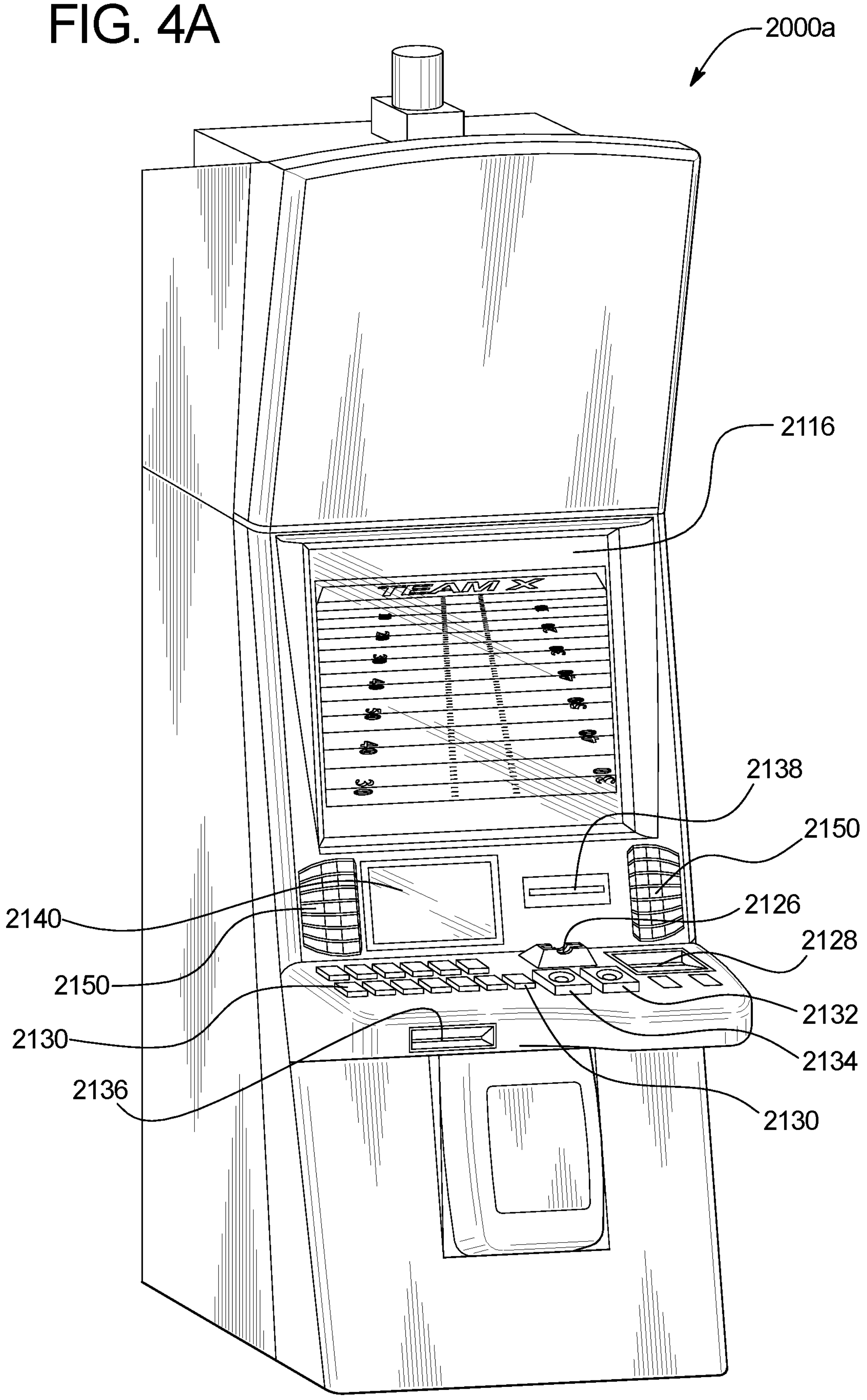
FIGS. 4A and 4B are perspective views of example alternative embodiments of the gaming system disclosed herein.
Figure 4B:
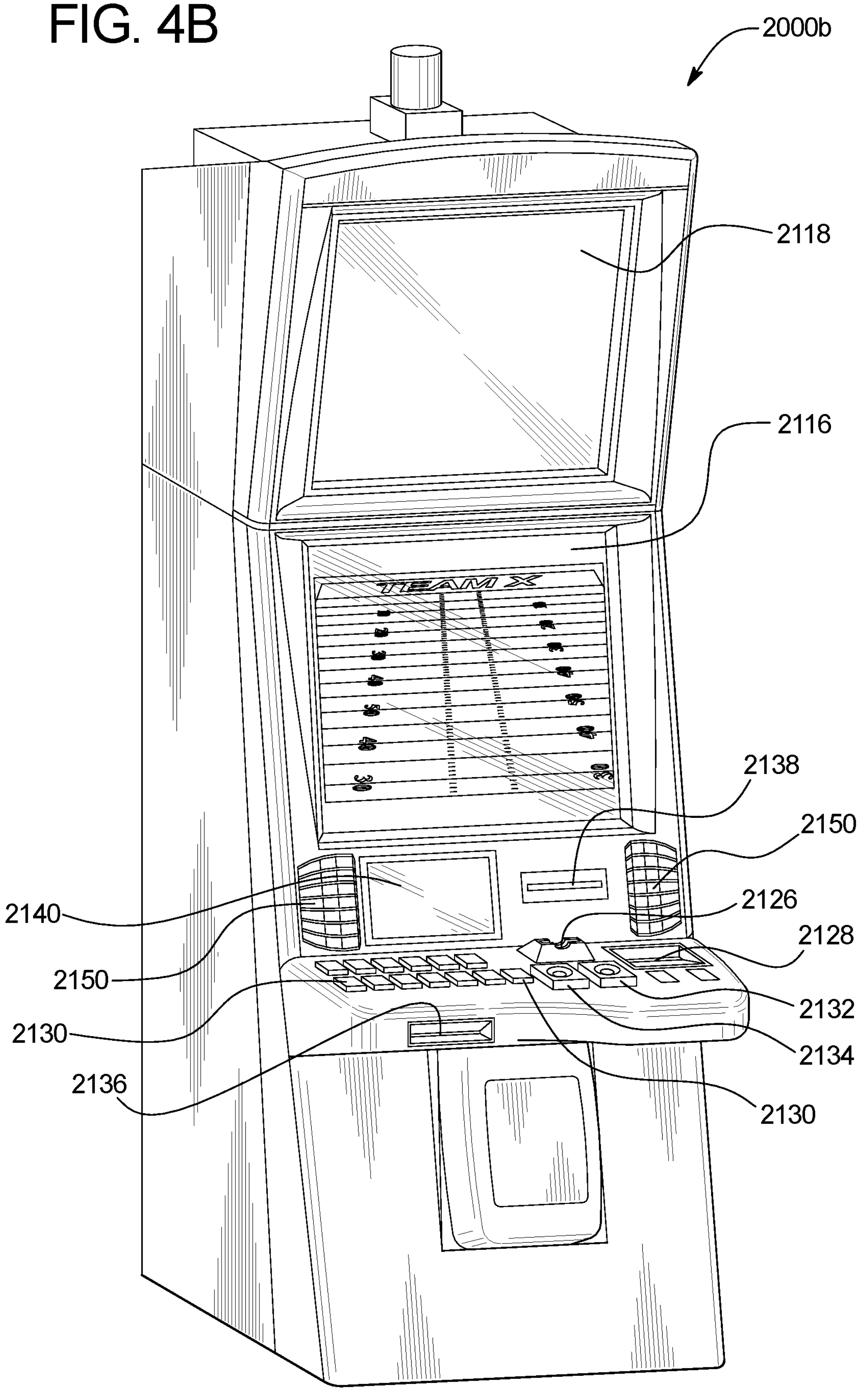
Figure 4C:
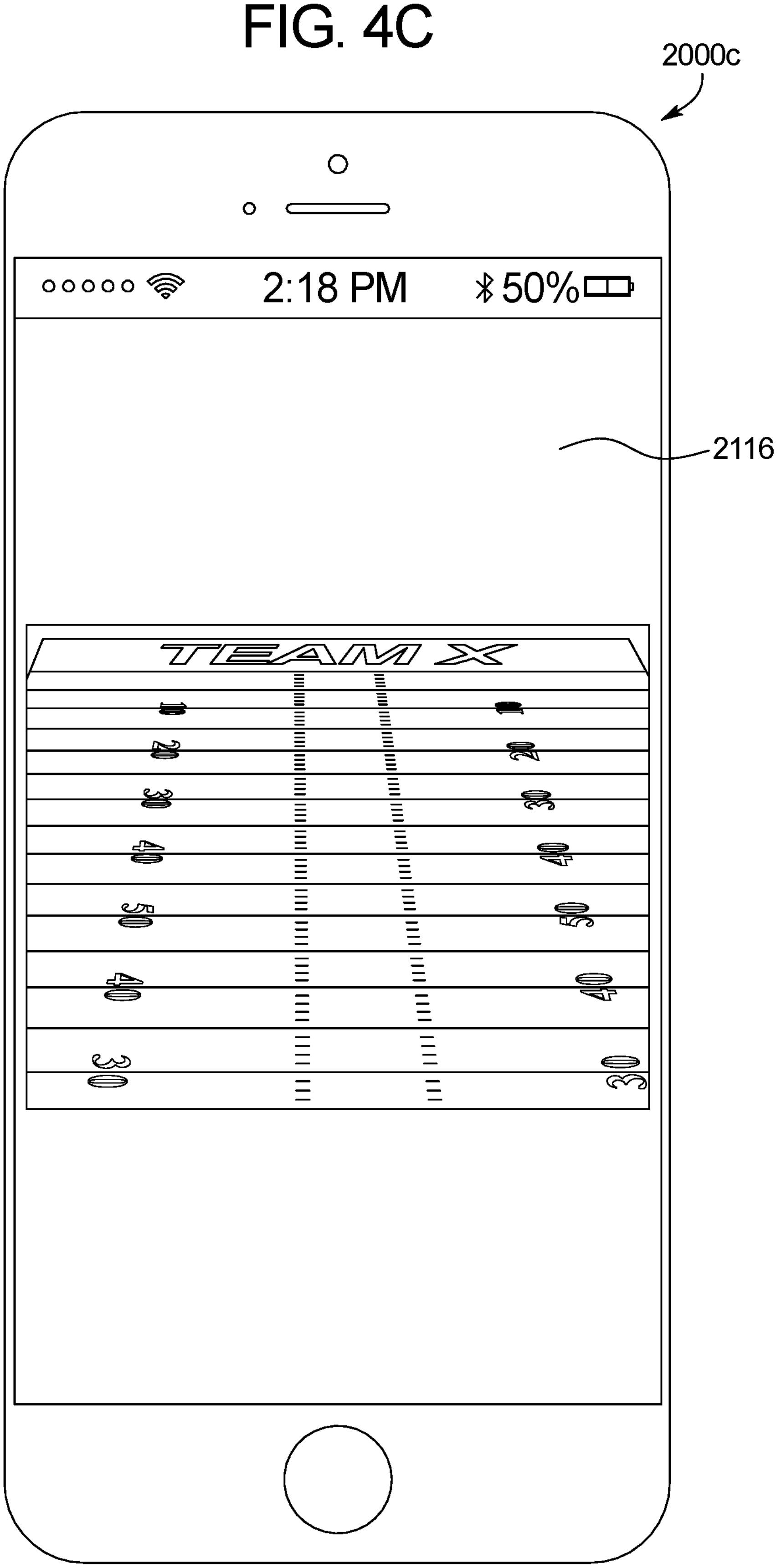
FIG. 4C is a front view of an example personal gaming device of the gaming system disclosed herein.

FIG. 3 is a block diagram of an example EGM 1000 and FIGS. 4A and 4B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*. Although the below refers to EGMs, in various embodiments personal gaming devices (such as personal gaming device 2000*c* of FIG. 4C) may include some or all of the below components.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM disclosed herein. In certain embodiments, the at least one memory device 1016 resides within the housing of the EGM (described below), while in other embodiments at least one component of the at least one memory device 1016 resides outside of the housing of the EGM. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols.

In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the player's computer, partly on the player's computer, as a stand-alone software package, partly on the player's computer and partly on a remote computer or entirely on the remote computer or server. In the latter scenario, the remote computer may be connected to the player's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, player input device components, information received from one or more player input devices, information stored in the at least one memory device 1016, etc. Examples of various authentication and/or validation components are described in U.S. Pat. No. 6,620,047, entitled "Electronic Gaming Apparatus Having Authentication Data Sets".

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one player identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 2000*a* illustrated in FIG. 4A includes a central display device 2116, a player tracking display 2140, a credit display 2120, and a bet display 2122. The example EGM 2000*b* illustrated in FIG. 4B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000*a* and 2000*b* illustrated in FIGS. 4A and 4B each include a ticket printer and dispenser 2136. Examples of ticket-in ticket-out (TITO) technology are described in U.S. Pat. No. 5,429,361, entitled "Gaming Machine Information, Communication and Display System"; U.S. Pat. No. 5,470,079, entitled "Gaming Machine Accounting and Monitoring System"; U.S. Pat. No. 5,265,874, entitled "Cashless Gaming Apparatus and Method"; U.S. Pat. No. 6,729,957, entitled "Gaming Method and Host Computer with Ticket-In/Ticket-Out Capability"; U.S. Pat. No. 6,729,958, entitled "Gaming System with Ticket-In/Ticket-Out Capability"; U.S. Pat. No. 6,736,725, entitled "Gaming Method and Host Computer with Ticket-In/Ticket-Out Capability"; U.S. Pat. No. 7,275,991, entitled "Slot Machine with Ticket-In/Ticket-Out Capability"; and U.S. Pat. No. 6,048,269, entitled "Coinless Slot Machine System and Method".

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player. Examples of providing payment using virtual tickets are described in U.S. Pat. No. 8,613,659, entitled "Virtual Ticket-In and Ticket-Out on a Gaming Machine".

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000*a* and 2000*b* illustrated in FIGS. 4A and 4B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000*a* and 2000*b* illustrated in FIGS. 4A and 4B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. Examples of funding an EGM via communication between the EGM and a mobile device (such as a mobile phone) of a player are described in U.S. Patent Application Publication No. 2013/0344942, entitled "Avatar as Security Measure for Mobile Device Use with Electronic Gaming Machine". When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 4A and 4B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000*a* and 2000*b* illustrated in FIGS. 4A and 4B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 4A and 4B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000*a* and 2000*b* illustrated in FIGS. 4A and 4B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more player input devices near the EGM. In one embodiment, a player input device docking region is provided, and includes a power distribution component that is configured to recharge a player input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., player input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one player identification module 1077 is configured to determine the identity of the current player or current owner of the EGM. For example, in one embodiment, the current player is required to perform a login process at the EGM in order to access one or more features. Alternatively, the EGM is configured to automatically determine the identity of the current player based on one or more external signals, such as an RFID tag or badge worn by the current player and that provides a wireless signal to the EGM that is used to determine the identity of the current player. In at least one embodiment, various security features are incorporated into the EGM to prevent unauthorized players from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. U.S. Pat. No. 7,290,072 describes a variety of EGMs including one or more communication ports that enable the EGMs to communicate and operate with one or more external peripherals.

As generally described above, in certain embodiments, such as the example EGMs 2000*a* and 2000*b* illustrated in FIGS. 4A and 4B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000*a* and 2000*b* shown in FIGS. 4A and 4B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

Operation of Primary or Base Games and/or Secondary or Bonus Games

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. Examples of this type of award evaluation are described in U.S. Pat. No. 7,470,183, entitled "Finite Pool Gaming Method and Apparatus"; U.S. Pat. No. 7,563,163, entitled "Gaming Device Including Outcome Pools for Providing Game Outcomes"; U.S. Pat. No. 7,833,092, entitled "Method and System for Compensating for Player Choice in a Game of Chance"; U.S. Pat. No. 8,070,579, entitled "Bingo System with Downloadable Common Patterns"; and U.S. Pat. No. 8,398,472, entitled "Central Determination Poker Game".

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. Examples of this type of award determination are described in U.S. Pat. No. 7,753,774, entitled "Using Multiple Bingo Cards to Represent Multiple Slot Paylines and Other Class III Game Options"; U.S. Pat. No. 7,731,581, entitled "Multi-Player Bingo Game with Multiple Alternative Outcome Displays"; U.S. Pat. No. 7,955,170, entitled "Providing Non-Bingo Outcomes for a Bingo Game"; U.S. Pat. No. 8,070,579, entitled "Bingo System with Downloadable Common Patterns"; and U.S. Pat. No. 8,500,538, entitled "Bingo Gaming System and Method for Providing Multiple Outcomes from Single Bingo Pattern".

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database configured to store player profiles, (b) a player tracking module configured to track players (as described below), and (c) a credit system configured to provide automated transactions. Examples of such accounting systems are described in U.S. Pat. No. 6,913,534, entitled "Gaming Machine Having a Lottery Game and Capability for Integration with Gaming Device Accounting System and Player Tracking System," and U.S. Pat. No. 8,597,116, entitled "Virtual Player Tracking and Related Services".

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. Examples of ways to win award determinations are described in U.S. Pat. No. 8,012,011, entitled "Gaming Device and Method Having Independent Reels and Multiple Ways of Winning"; U.S. Pat. No. 8,241,104, entitled "Gaming Device and Method Having Designated Rules for Determining Ways To Win"; and U.S. Pat. No. 8,430,739, entitled "Gaming System and Method Having Wager Dependent Different Symbol Evaluations".

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. Examples of progressive gaming systems are described in U.S. Pat. No. 7,585,223, entitled "Server Based Gaming System Having Multiple Progressive Awards"; U.S. Pat. No. 7,651,392, entitled "Gaming Device System Having Partial Progressive Payout"; U.S. Pat. No. 7,666,093, entitled "Gaming Method and Device Involving Progressive Wagers"; U.S. Pat. No. 7,780,523, entitled "Server Based Gaming System Having Multiple Progressive Awards"; and U.S. Pat. No. 8,337,298, entitled "Gaming Device Having Multiple Different Types of Progressive Awards".

As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. Examples of group gaming systems are described in U.S. Pat. No. 8,070,583, entitled "Server Based Gaming System and Method for Selectively Providing One or More Different Tournaments"; U.S. Pat. No. 8,500,548, entitled "Gaming System and Method for Providing Team Progressive Awards"; and U.S. Pat. No. 8,562,423, entitled "Method and Apparatus for Rewarding Multiple Game Players for a Single Win".

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. Examples of player tracking systems are described in U.S. Pat. No. 6,722,985, entitled "Universal Player Tracking System"; U.S. Pat. No. 6,908,387, entitled "Player Tracking Communication Mechanisms in a Gaming Machine"; U.S. Pat. No. 7,311,605, entitled "Player Tracking Assembly for Complete Patron Tracking for Both Gaming and Non-Gaming Casino Activity"; U.S. Pat. No. 7,611,411, entitled "Player Tracking Instruments Having Multiple Communication Modes"; U.S. Pat. No. 7,617,151, entitled "Alternative Player Tracking Techniques"; and U.S. Pat. No. 8,057,298, entitled "Virtual Player Tracking and Related Services".

Web-Based Gaming

In various embodiments, the gaming system includes one or more servers configured to communicate with a personal gaming device—such as a smartphone, a tablet computer, a desktop computer, or a laptop computer—to enable web-based game play using the personal gaming device. In various embodiments, the player must first access a gaming website via an Internet browser of the personal gaming device or execute an application (commonly called an "app") installed on the personal gaming device before the player can use the personal gaming device to participate in web-based game play. In certain embodiments, the one or more servers and the personal gaming device operate in a thin-client environment. In these embodiments, the personal gaming device receives inputs via one or more input devices (such as a touch screen and/or physical buttons), the personal gaming device sends the received inputs to the one or more servers, the one or more servers make various determinations based on the inputs and determine content to be displayed (such as a randomly determined game outcome and corresponding award), the one or more servers send the content to the personal gaming device, and the personal gaming device displays the content.

In certain such embodiments, the one or more servers must identify the player before enabling game play on the personal gaming device (or, in some embodiments, before enabling monetary wager-based game play on the personal gaming device). In these embodiments, the player must identify herself to the one or more servers, such as by inputting the player's unique playername and password combination, providing an input to a biometric sensor (e.g., a fingerprint sensor, a retinal sensor, a voice sensor, or a facial-recognition sensor), or providing any other suitable information.

Once identified, the one or more servers enable the player to establish an account balance from which the player can draw credits usable to wager on plays of a game. In certain embodiments, the one or more servers enable the player to initiate an electronic funds transfer to transfer funds from a bank account to the player's account balance. In other embodiments, the one or more servers enable the player to make a payment using the player's credit card, debit card, or other suitable device to add money to the player's account balance. In other embodiments, the one or more servers enable the player to add money to the player's account balance via a peer-to-peer type application, such as PayPal or Venmo. The one or more servers also enable the player to cash out the player's account balance (or part of it) in any suitable manner, such as via an electronic funds transfer, by initiating creation of a paper check that is mailed to the player, or by initiating printing of a voucher at a kiosk in a gaming establishment.

In certain embodiments, the one or more servers include a payment server that handles establishing and cashing out players' account balances and a separate game server configured to determine the outcome and any associated award for a play of a game. In these embodiments, the game server is configured to communicate with the personal gaming device and the payment device, and the personal gaming device and the payment device are not configured to directly communicate with one another. In these embodiments, when the game server receives data representing a request to start a play of a game at a desired wager, the game server sends data representing the desired wager to the payment server. The payment server determines whether the player's account balance can cover the desired wager (i.e., includes a monetary balance at least equal to the desired wager).

If the payment server determines that the player's account balance cannot cover the desired wager, the payment server notifies the game server, which then instructs the personal gaming device to display a suitable notification to the player that the player's account balance is too low to place the desired wager. If the payment server determines that the player's account balance can cover the desired wager, the payment server deducts the desired wager from the account balance and notifies the game server. The game server then determines an outcome and any associated award for the play of the game. The game server notifies the payment server of any nonzero award, and the payment server increases the player's account balance by the nonzero award. The game server sends data representing the outcome and any award to the personal gaming device, which displays the outcome and any award.

In certain embodiments, the one or more servers enable web-based game play using a personal gaming device only if the personal gaming device satisfies one or more jurisdictional requirements. In one embodiment, the one or more servers enable web-based game play using the personal gaming device only if the personal gaming device is located within a designated geographic area (such as within certain state or county lines or within the boundaries of a gaming establishment). In this embodiment, the geolocation module of the personal gaming device determines the location of the personal gaming device and sends the location to the one or more servers, which determine whether the personal gaming device is located within the designated geographic area. In various embodiments, the one or more servers enable non-monetary wager-based game play if the personal gaming device is located outside of the designated geographic area.

In various embodiments, the gaming system includes an EGM configured to communicate with a personal gaming device—such as a smartphone, a tablet computer, a desktop computer, or a laptop computer—to enable tethered mobile game play using the personal gaming device. Generally, in these embodiments, the EGM establishes communication with the personal gaming device and enables the player to play games on the EGM remotely via the personal gaming device. In certain embodiments, the gaming system includes a geo-fence system that enables tethered game play within a particular geographic area but not outside of that geographic area. Examples of tethering an EGM to a personal gaming device and geo-fencing are described in U.S. Patent Appl. Pub. No. 2013/0267324, entitled "Remote Gaming Method Allowing Temporary Inactivation Without Terminating Playing Session Due to Game Inactivity".

Social Network Integration

In certain embodiments, the gaming system is configured to communicate with a social network server that hosts or partially hosts a social networking website via a data network (such as the Internet) to integrate a player's gaming experience with the player's social networking account. This enables the gaming system to send certain information to the social network server that the social network server can use to create content (such as text, an image, and/or a video) and post it to the player's wall, newsfeed, or similar area of the social networking website accessible by the player's connections (and in certain cases the public) such that the player's connections can view that information. This also enables the gaming system to receive certain information from the social network server, such as the player's likes or dislikes or the player's list of connections. In certain embodiments, the gaming system enables the player to link the player's player account to the player's social networking account(s). This enables the gaming system to, once it identifies the player and initiates a gaming session (such as via the player logging in to a website (or an application) on the player's personal gaming device or via the player inserting the player's player tracking card into an EGM), link that gaming session to the player's social networking account(s). In other embodiments, the gaming system enables the player to link the player's social networking account(s) to individual gaming sessions when desired by providing the required login information.

For instance, in one embodiment, if a player wins a particular award (e.g., a progressive award or a jackpot award) or an award that exceeds a certain threshold (e.g., an award exceeding $1,000), the gaming system sends information about the award to the social network server to enable the server to create associated content (such as a screenshot of the outcome and associated award) and to post that content to the player's wall (or other suitable area) of the social networking website for the player's connections to see (and to entice them to play). In another embodiment, if a player joins a multiplayer game and there is another seat available, the gaming system sends that information to the social network sever to enable the server to create associated content (such as text indicating a vacancy for that particular game) and to post that content to the player's wall (or other suitable area) of the social networking website for the player's connections to see (and to entice them to fill the vacancy). In another embodiment, if the player consents, the gaming system sends advertisement information or offer information to the social network server to enable the social network server to create associated content (such as text or an image reflecting an advertisement and/or an offer) and to post that content to the player's wall (or other suitable area) of the social networking website for the player's connections to see. In another embodiment, the gaming system enables the player to recommend a game to the player's connections by posting a recommendation to the player's wall (or other suitable area) of the social networking website.

Differentiating Certain Gaming Systems from General Purpose Computing Devices Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code. Examples of EGM code authentication are described in U.S. Pat. No. 6,962,530, entitled "Authentication in a Secure Computerized Gaming System"; U.S. Pat. No. 7,043,641, entitled "Encryption in a Secure Computerized Gaming System"; U.S. Pat. No. 7,201,662, entitled "Method and Apparatus for Software Authentication"; and U.S. Pat. No. 8,627,097, entitled "System and Method Enabling Parallel Processing of Hash Functions Using Authentication Checkpoint Hashes".

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in the player's assertion. Examples of a state-based EGM, recovery from malfunctions, and game history are described in U.S. Pat. No. 6,804,763, entitled "High Performance Battery Backed RAM Interface"; U.S. Pat. No. 6,863,608, entitled "Frame Capture of Actual Game Play"; U.S. Pat. No. 7,111,141, entitled "Dynamic NV-RAM"; and U.S. Pat. No. 7,384,339, entitled, "Frame Capture of Actual Game Play".

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives. Examples of trusted memory devices are described in U.S. Pat. No. 6,685,567, entitled "Process Verification".

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected. Examples of trusted memory devices/sources are described in U.S. Pat. No. 7,515,718, entitled "Secured Virtual Network in a Gaming Environment".

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present. Examples of using a mass storage device are described in U.S. Pat. No. 6,149,522, entitled "Method of Authenticating Game Data Sets in an Electronic Casino Gaming System".

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention claimed is:

1. A gaming system comprising:

a processor; and a memory device that stores a plurality of instructions that, when executed by the processor following a placement of a sporting event wager on an outcome of a sporting event, cause the processor to:

after a determination that the placed sporting event wager comprises a winning sporting event wager and responsive to a receipt of data associated with an exchange of an amount of an unmodified award associated with the placed sporting event wager for a variable award:

determine an amount of the variable award, wherein at least a portion of the amount of the variable award is randomly determined and cause a display, by a display device, of the determined amount of the variable award; and after the determination that the placed sporting event wager comprises the winning sporting event wager without receiving any data associated with any exchange of the amount of the unmodified award associated with the placed sporting event wager for any variable award, cause a display, by the display device, of the unmodified award associated with the placed sporting event wager, wherein no portion of the unmodified award associated with the placed sporting event wager is randomly determined.

2. The gaming system of claim 1, wherein the exchange occurs prior to the determination that the placed sporting event wager comprises the winning sporting event wager.

3. The gaming system of claim 1, wherein the determination of the amount of the variable award occurs after a redemption of a sporting event wager ticket associated with the placed sporting event wager.

4. The gaming system of claim 1, wherein the amount of the unmodified award exchanged for the variable award comprises a first portion of less than all of the unmodified award.

5. The gaming system of claim 4, wherein an award amount associated with the winning sporting event wager comprises the determined amount of the variable award and a second portion of the unmodified award not exchanged for the variable award.

6. The gaming system of claim 1, wherein an average expected amount of the variable award equals the exchanged amount of the unmodified award.

7. The gaming system of claim 1, wherein the determined amount of the variable award comprises at least one of an amount of an award associated with a randomly determined game outcome of a play of a game of chance, an amount of an award associated with a game outcome of a play of a game of skill, and a randomly selected amount from a weighted table associated with the amount of the unmodified award associated with the placed sporting event wager.

8. The gaming system of claim 1, wherein the variable award comprises at least one of a value, a modification of another sporting event wager, a modification of a play of a game of chance, a modification of a play of a game of skill, and winning a progressive award.

9. The gaming system of claim 1, wherein the outcome of the sporting event comprises an outcome of an in-game event of the sporting event.

10. The gaming system of claim 1, further comprising an acceptor, wherein when executed by the processor, the plurality of instructions cause the processor to, responsive to a physical item being received via the acceptor, modify a credit balance based on a monetary value associated with the received physical item, and responsive to a cashout input being received, cause an initiation of any payout associated with the credit balance.

11. A gaming system comprising:

a processor; and a memory device that stores a plurality of instructions that, when executed by the processor, cause the processor to:

receive a placement of a sporting event wager on an outcome of a sporting event, after a determination that the placed sporting event wager comprises a winning sporting event wager, prior to causing a first award associated with the winning sporting event wager to be available, and responsive to receipt of an input to forgo part of the first award associated with the winning sporting event wager, randomly determine a second award, wherein an average expected value of the second award is based on the forgone part of the first award, and after the determination that the placed sporting event wager comprises the winning sporting event wager and without receiving any inputs to forgo part of the first award associated with the winning sporting event wager, causing the first award associated with the winning sporting event wager to be available, wherein the first award is determined independent of any random determination.

12. A method of operating a gaming system following a placement of a sporting event wager on an outcome of a sporting event, the method comprising:

after a determination that the placed sporting event wager comprises a winning sporting event wager and responsive to a receipt, of data associated with an exchange of an amount of a unmodified award associated with the placed sporting event wager for a variable award, determining, by a processor, an amount of the variable award, wherein at least a portion of the amount of the variable award is randomly determined, and displaying, by a display device, the determined amount of the variable award, and after the determination that the placed sporting event wager comprises the winning sporting event wager without receiving any data associated with any exchange of the amount of the unmodified award associated with the placed sporting event wager for any variable award, displaying, by the display device, the unmodified award associated with the placed sporting event wager, wherein no portion of the unmodified award associated with the placed sporting event wager is randomly determined.

13. The method of claim 12, wherein the exchange occurs prior to the determination that the placed sporting event wager comprises the winning sporting event wager.

14. The method of claim 12, wherein the determination of the amount of the variable award occurs after a redemption of a sporting event wager ticket associated with the placed sporting event wager.

15. The method of claim 12, wherein the amount of the unmodified award exchanged for the variable award comprises a first portion of less than all of the unmodified award.

16. The method of claim 15, wherein an award amount associated with the winning sporting event wager comprises the determined amount of the variable award and a second portion of the unmodified award not exchanged for the variable award.

17. The method of claim 12, wherein an average expected amount of the variable award equals the exchanged amount of the unmodified award.

18. The method of claim 12, wherein the determined amount of the variable award comprises at least one of an amount of an award associated with a randomly determined game outcome of a play of a game of chance, an amount of an award associated with a game outcome of a play of a game of skill, and a randomly selected amount from a weighted table associated with the amount of the unmodified award associated with the placed sporting event wager.

19. The method of claim 12, wherein the variable award comprises at least one of a value, a modification of another sporting event wager, a modification of a play of a game of chance, a modification of a play of a game of skill, and winning a progressive award.

20. The method of claim 12, wherein the outcome of the sporting event comprises an outcome of an in-game event of the sporting event.

* * * * *